US012607839B2

(12) United States Patent　(10) Patent No.: US 12,607,839 B2

Imazeki et al.　(45) Date of Patent:　Apr. 21, 2026

(54) MICROSCOPE SYSTEM AND MICROSCOPE CONTROL DEVICE

(71) Applicant: Evident Corporation, Nagano (JP)

(72) Inventors: Koji Imazeki, Nagano (JP); Susumu Honda, Nagano (JP)

(73) Assignee: Evident Corporation, Nagano (JP)

( * ) Notice: Subject to any disclaimer, the term of this patent is extended or adjusted under 35 U.S.C. 154(b) by 757 days.

(21) Appl. No.: 17/984,488

(22) Filed: Nov. 10, 2022

(65) Prior Publication Data

US 2023/0168481 A1 Jun. 1, 2023

(30) Foreign Application Priority Data

Nov. 26, 2021　(JP) ................................. 2021-192084

(51) Int. Cl.
G02B 21/00　(2006.01)
G02B 21/36　(2006.01)
(52) U.S. Cl.
CPC ....... G02B 21/006 (2013.01); G02B 21/0072 (2013.01); G02B 21/008 (2013.01); G02B 21/361 (2013.01)
(58) Field of Classification Search
None
See application file for complete search history.

(56) References Cited

U.S. PATENT DOCUMENTS

| | | | | |
|---|---|---|---|---|
| 9,911,028 | B2 * | 3/2018 | Iwase ................... | G02B 21/365 |
| 2003/0142398 | A1 * | 7/2003 | Leblans ............... | G02B 21/244 |
| | | | | 250/201.3 |
| 2015/0022651 | A1 * | 1/2015 | Wu ...................... | G02B 21/361 |
| | | | | 348/79 |
| 2018/0081162 | A1 * | 3/2018 | Abe ......................... | G06T 5/73 |

FOREIGN PATENT DOCUMENTS

| | | |
|---|---|---|
| JP | 2014085599 A | 5/2014 |
| JP | 6154291 B2 | 6/2017 |

OTHER PUBLICATIONS

Japanese Office Action (and an English language translation thereof) dated Aug. 12, 2025, issued in counterpart Japanese Application No. 2021-192084.

* cited by examiner

*Primary Examiner* — Robert E. Tallman
(74) *Attorney, Agent, or Firm* — Holtz, Holtz & Volek PC

(57) ABSTRACT

A microscope system comprises: a light source; an objective lens; a stage; a two-dimensional image sensor that captures an image of a specimen placed on the stage; a focusing device that changes distance between the objective lens and the stage; and a control circuit, wherein the control circuit executes, during a movement period in which the stage moves in a direction orthogonal to an optical axis of the objective lens, focus control for controlling the focusing device based on focus evaluation information detected during the movement period, and exposure control for controlling an exposure period of the two-dimensional image sensor, and executes light emission control that causes the light source to emit light with different light emission intensities during the exposure period and during a focus evaluation period in which the focus evaluation information is detected.

19 Claims, 16 Drawing Sheets

MICROSCOPE SYSTEM AND MICROSCOPE CONTROL DEVICE

CROSS REFERENCE TO RELATED APPLICATIONS

This application is based upon and claims the benefit of priority from prior Japanese Patent Application No. 2021-192084, filed Nov. 26, 2021, the entire contents of which are incorporated herein by this reference.

TECHNICAL FIELD

The disclosure of the present specification relates to a microscope system and a microscope control device.

BACKGROUND

Whole slide imaging has attracted attention as one of techniques for reducing the burden on a pathologist in pathological diagnosis. Whole slide imaging is a technique for creating a digital image by scanning an entire specimen on a slide glass, and by acquiring and tiling a plurality of images, a region wider than the field of view of the microscope can be imaged using a high resolving power.

In order to improve the throughput of whole slide imaging, a non-stop method of performing imaging at each photographic position without stopping the stage is effective. On the other hand, when photography is performed while moving the stage, blurring occurs in the image. A technique pertaining to such a technical problem is disclosed in Japanese Patent No. 6154291, for example. Japanese Patent No. 6154291 discloses a technique for suppressing image blurring by instantaneously emitting light from a light source during an exposure period.

SUMMARY

A microscope system according to an embodiment of the present invention includes: a light source; an objective lens; a stage; a two-dimensional image sensor that captures an image of a specimen placed on the stage; a focusing device that changes distance between the objective lens and the stage; and a control circuit. The control circuit executes, during a movement period in which the stage moves in a direction orthogonal to an optical axis of the objective lens, focus control for controlling the focusing device based on focus evaluation information detected during the movement period, and exposure control for controlling an exposure period of the two-dimensional image sensor, and executes light emission control that causes the light source to emit light with different light emission intensities during the exposure period and during a focus evaluation period in which the focus evaluation information is detected.

A microscope control device according to an embodiment of the present invention controls a microscope that includes a light source, an objective lens, a stage, a two-dimensional image sensor that captures an image of a specimen placed on the stage, and a focusing device that changes the distance between the objective lens and the stage. The microscope control device includes a control circuit, wherein the control circuit executes, during a movement period in which the stage moves in a direction orthogonal to an optical axis of the objective lens, focus control for controlling the focusing device based on focus evaluation information detected during the movement period, and exposure control for controlling an exposure period of the two-dimensional image sensor, and executes light emission control that causes the light source to emit light with different light emission intensities during the exposure period and during a focus evaluation period in which the focus evaluation information is detected.

BRIEF DESCRIPTION OF DRAWINGS

The present invention will be more apparent from the following detailed description when the accompanying drawings are referenced.

DESCRIPTION OF EMBODIMENTS

In the case of the technique disclosed in Japanese Patent No. 6154291, there is no potential for executing autofocus, and thus it is not always possible to photograph a specimen in a focused state. Focusing on the specimen can be performed by obtaining the focusing position beforehand, but the process of obtaining the focusing position, which is performed before scanning, hinders any improvements in throughput.

Embodiments of the present invention will be described hereinbelow in view of the foregoing circumstances.

First Embodiment

Figure 1:
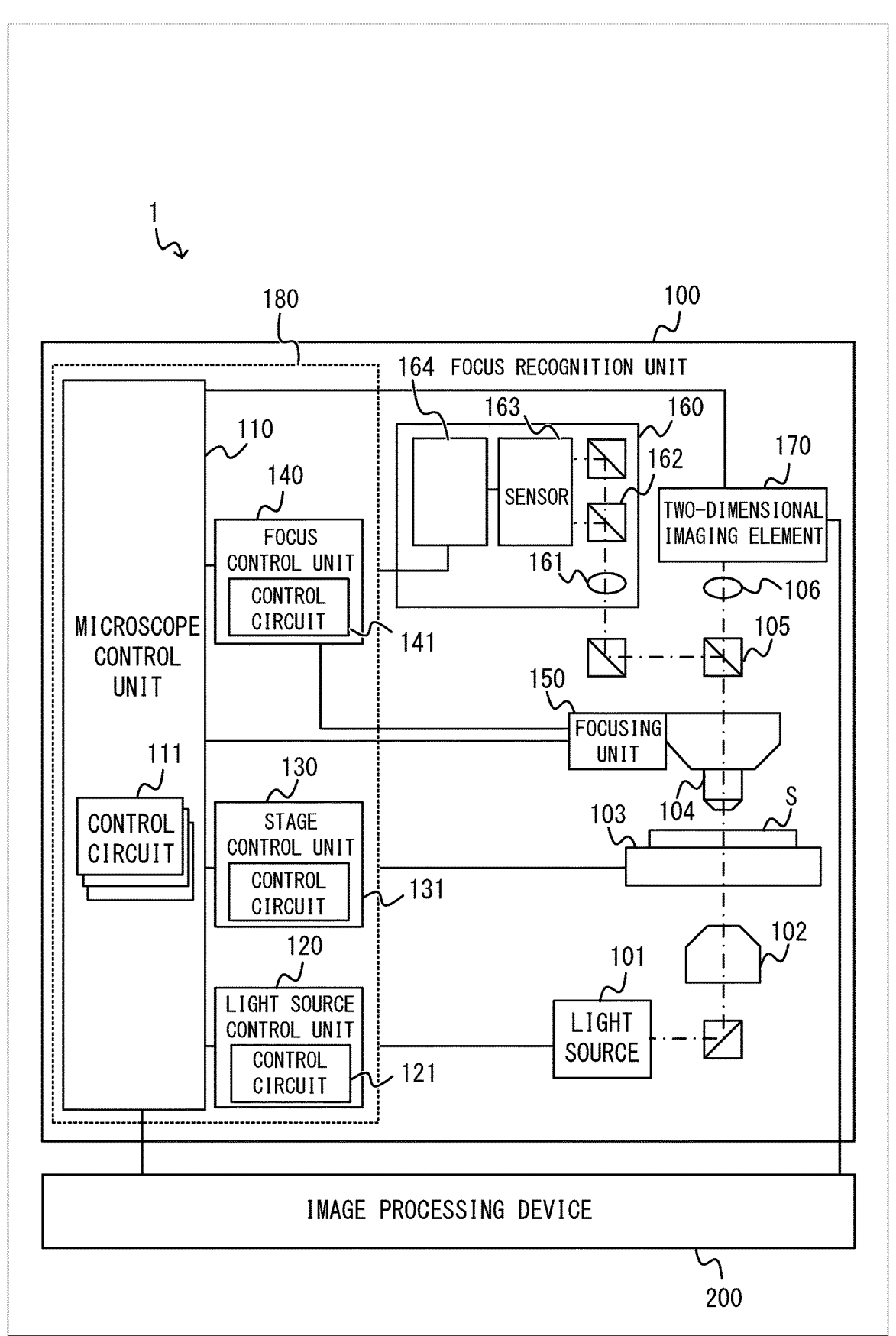
FIG. 1 is a diagram illustrating a configuration of a microscope system according to a first embodiment.
Figure 2:
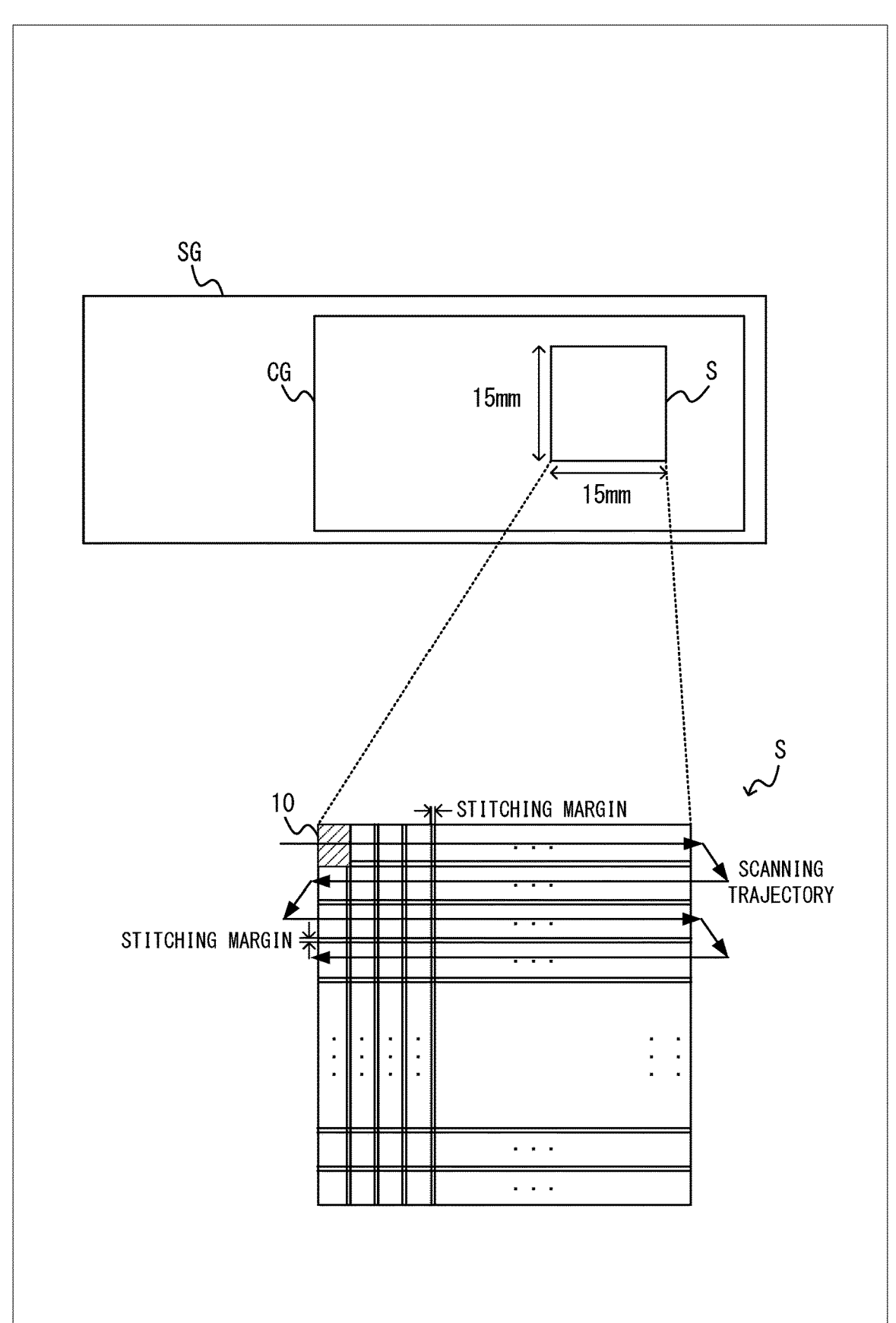
FIG. 2 is a diagram to illustrate whole slide imaging.

FIG. 1 is a diagram illustrating an example of a configuration of a microscope system according to this embodiment. FIG. 2 is a diagram to illustrate whole slide imaging A microscope system 1, which is illustrated in FIG. 1, is an example of a microscope system according to a first embodiment, and is a whole slide imaging device for generating whole slide images (WSI). A configuration of the microscope system 1 will be described hereinbelow with reference to FIGS. 1 and 2.

As illustrated in FIG. 1, the microscope system 1 includes a microscope device 100 and an image processing device 200. The microscope device 100 scans a specimen S wider than the actual field of view by using an objective lens 104 having a high numerical aperture, and outputs a plurality of images of a specimen S to the image processing device 200. For example, if a WSI is generated by imaging the entire specimen S, which is sandwiched between a slide glass SG and a cover glass CG as illustrated in FIG. 2, the entire specimen S is scanned by repeating the imaging while moving the actual field of view 10 relative to the specimen S. At such time, the imaging position is set such that the image of the specimen S obtained in each imaging instance overlaps a portion of the image captured in an adjacent imaging position (see the stitching step in FIG. 2).

The image processing device 200 combines a plurality of images of the specimen S outputted from the microscope device 100 to generate a stitched image. Specifically, the image processing device 200 generates a WSI by stitching a plurality of images by using the overlapping portion between images captured at adjacent imaging positions as a stitching margin. As a result, stitching can be performed by accurately specifying the relative positions of the plurality of images.

With the microscope system 1, it is possible to use the whole slide imaging technique to provide the user with information of a wider range than the actual field of view 10 of the microscope device 100 as one image (WSI) having a high resolution.

Note that, in the present specification, WSI, which is used in fields such as pathological diagnosis, is cited as an example for stitched images, but the stitched images generated by the microscope system of each of the embodiments are not limited to WSI, and may be images which are used in applications such as industrial product inspections.

As illustrated in FIG. 1, the microscope device 100 includes at least a light source 101, an objective lens 104, a stage 103, a two-dimensional imaging element 170, a focusing unit 150, and a control unit 180. The control unit 180 may include one or more control circuits. The control unit 180 may include a microscope control unit 110, a light source control unit 120, a stage control unit 130, and a focus control unit 140, and each may further include one or more control circuits (a control circuit 111, a control circuit 121, a control circuit 131, and a control circuit 141).

The light source 101 is, for example, a light-emitting diode. However, as long as the light emission period and the light emission intensity can be finely controlled, the light source 101 is not particularly limited to being a light-emitting diode. The light source 101 is configured to emit light in accordance with an input from the light source control unit 120.

The objective lens 104 is, for example, a 20× objective lens. However, the objective lens 104 only needs to have a numerical aperture capable of realizing the resolution required for images stitched by the user, and the magnification of the objective lens 104 is not limited to 20×. The objective lens 104 moves in the optical axis direction under the operation of the focusing unit 150.

The stage 103 includes at least an XY stage that moves in an XY direction orthogonal to the optical axis of the objective lens 104. The stage 103 may further include a Z stage that moves in the optical axis direction. The stage 103 is configured to move in accordance with an input from the stage control unit 130. The stage 103 may include, for example, an actuator that includes a stepping motor and a ball screw (not illustrated); for example, the position of the stage 103 may be controlled by controlling the actuator in an open-loop system.

The two-dimensional imaging element 170 is, for example, a CMOS image sensor, and captures images of the specimen S placed on the stage 103. The two-dimensional imaging element 170 has an electronic shutter such as a rolling shutter or a global shutter. The two-dimensional imaging element 170 is configured such that at least exposure start timing is controlled in accordance with a control signal from the microscope control unit 110.

More specifically, in the two-dimensional imaging element 170, for example, the timings of the exposure start and the exposure end may be controlled by the pulse width of the control signal, or the exposure may end after a time lapse, which is preset for the two-dimensional imaging element 170, since the exposure start time specified by the control signal. That is, the microscope control unit 110 is configured to execute exposure control for controlling the exposure period of the two-dimensional imaging element 170.

The focusing unit 150 is a focusing device that changes the distance between the objective lens 104 and the stage 103. The focusing unit 150 is configured to move the objective lens 104 in the optical axis direction according to an input from the focus control unit 140. For example, when the execution of real-time AF is instructed by the microscope control unit 110, the focus control unit 140 is configured to execute focus control to control the focusing unit 150 in a predetermined sampling period, for example, so that the specimen S is in focus. More specifically, the focus control unit 140 controls the focusing unit 150 based on focus evaluation information outputted from a focusing unit 160, which is described subsequently.

In the microscope system 1 configured as described above, the microscope device 100 captures an image of the specimen S and scans the target range without stopping the stage 103 at the imaging position. That is, during the movement period in which the objective lens 104 moves in the direction orthogonal to the optical axis of the stage 103, the control circuit included in the control unit 180 executes exposure control for controlling the exposure period of the two-dimensional imaging element 170. As a result, the lead time required for scanning from the start to the end of scanning can be shortened in comparison with a case where the stage 103 is stopped at each imaging position and an image of the specimen S is captured.

In addition, in the microscope system 1, the microscope device 100 executes autofocus in real time during scanning. That is, during the movement period in which the objective lens 104 moves in the direction orthogonal to the optical axis of the stage 103, the control circuit included in the control unit 180 executes focus control for controlling the focusing unit 150 based on the focus evaluation information detected within the movement period. More specifically, a focus evaluation period during which the focus evaluation information is detected is set using a predetermined sampling period, and thus the control circuit executes focus control in the predetermined sampling period. As a result, it is possible to suppress focus deviation in each imaging position, and thus, it is possible to generate a WSI of high image quality. In addition, in comparison with a case where information (map information) on the focusing position in the scanning range is obtained and held in advance before the start of scanning, and focusing is performed using the information (map information) of the focusing position in the scanning range obtained in advance during scanning, the step of obtaining the map information before scanning can be omitted. Therefore, it is possible to reduce the burden on the user and shorten the working time.

Furthermore, in the microscope system 1, the microscope device 100 executes light emission control in addition to the focus control and the exposure control described above during a movement period in which the objective lens 104 moves in a direction orthogonal to the optical axis of the stage 103. Specifically, the control circuit included in the control unit 180 executes light emission control that causes the light source 101 to emit light with different light emission intensities during the exposure period and during the focus evaluation period for detecting focus evaluation information. As a result, it is possible to perform light emission control according to a required light amount which is different for each period, and it is thus possible to suppress damage to the specimen S caused by the illumination. Furthermore, the effect of noise caused by light incident on the two-dimensional imaging element 170 outside the exposure period can also be suppressed.

Therefore, in the case of the microscope system 1, it is possible to achieve both image quality and throughput at a high level, and a WSI of high image quality can be obtained in a short time.

Figure 3:
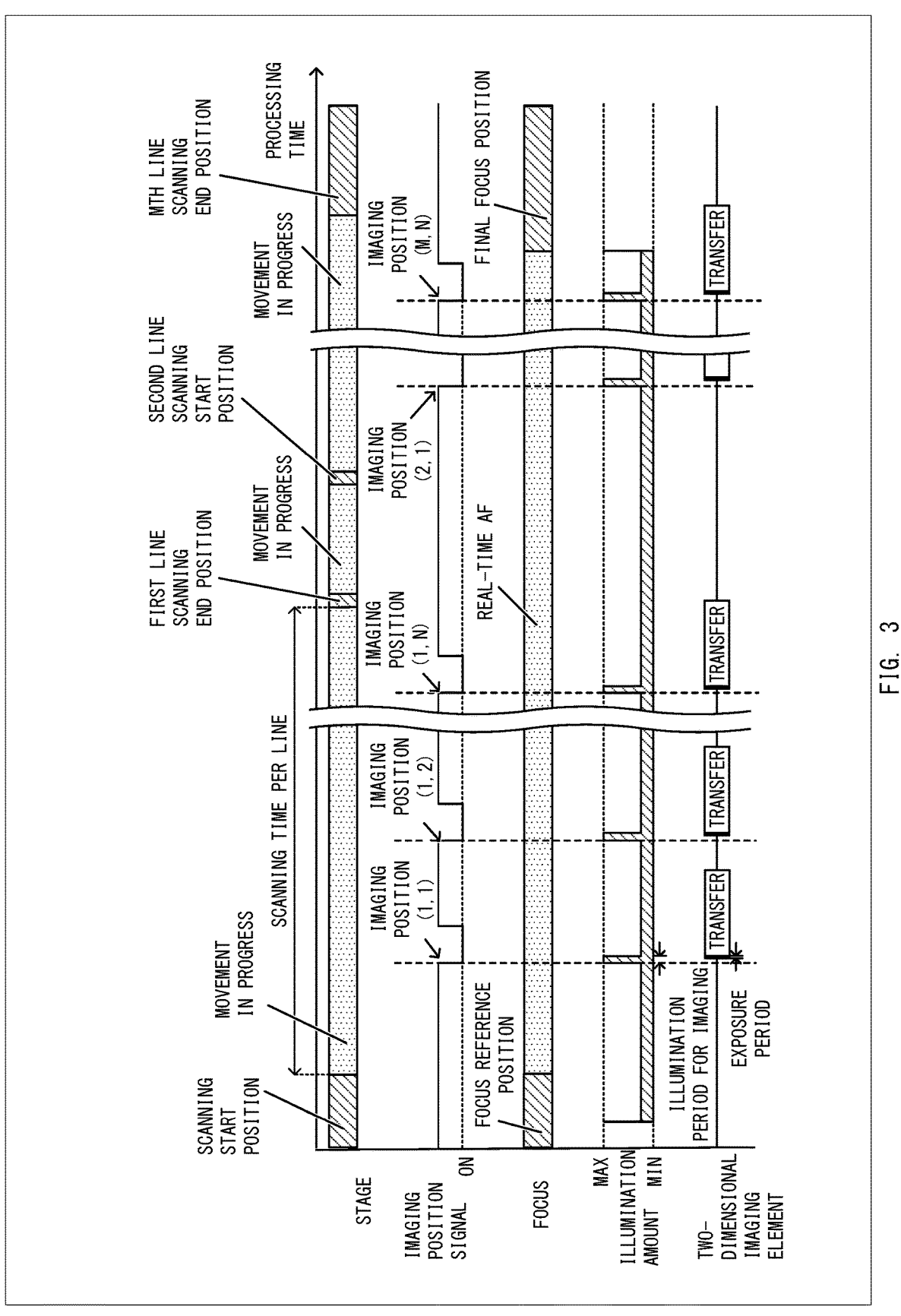
FIG. 3 is a diagram illustrating an example of a timing chart for processing performed by the microscope system.

FIG. 3 is a diagram illustrating an example of a timing chart for processing performed by the microscope system. Hereinafter, focus control, light emission control, exposure control, and the relationships therebetween will be described in more detail with reference to FIG. 3.

First, regarding focus control, as illustrated in FIG. 3, when the stage 103 starts moving from the scan start position and the movement period starts, the control unit 180 starts real-time AF in accordance with the start of the movement period. At the start of real-time AF, the objective lens 104 is positioned in the focus reference position by the focusing unit 150.

During the period in which the real-time AF is being executed, the focus control unit 140 executes focus control for controlling the focusing unit 150 based on the focus evaluation information outputted from the focusing unit 160 in a predetermined sampling period. Furthermore, when the stage 103 passes through the last imaging position during the movement period, the control unit 180 ends the real-time AF. After completion of the real-time AF, the focusing unit 150 maintains the objective lens 104 in the final focusing position.

Note that the predetermined sampling period may be a time interval sufficiently longer than the length of the exposure period (exposure time), which is controlled in the exposure control (described subsequently), and is desirably ten or more times the exposure time, for example. As a result, it is possible to easily avoid temporal overlap between the exposure period and the focus evaluation period generated for each sampling period, and thus, it is possible to realize light emission control in which the light emission intensity of the light source 101 is made different during the exposure period and the focus evaluation period. In other words, the control unit 180 desirably sets the focus evaluation period so that there is no overlap with the exposure period.

However, it is desirable to perform focusing by detecting the focus evaluation information at least once while the stage 103 is moving from a certain imaging position to the next imaging position. That is, the control unit 180 desirably sets at least one focus evaluation period between the first exposure period and the second exposure period which are adjacent in a temporal direction. As a result, focusing is performed in each imaging position, and hence the suppression of focus deviation can be expected. In order to provide at least one focus evaluation period between the first exposure period and the second exposure period, the predetermined sampling period is desirably shorter than the interval of the exposure period, that is, the period (frame period) corresponding to the frame rate.

The number of samples to be performed between imaging positions in order to sufficiently suppress the focus deviation depends on the magnitude of the generated focus deviation, the focus speed of the focusing unit 150, and the like. Therefore, it is desirable to set the number of samples or the sampling period in consideration of the foregoing, and the control unit 180 desirably performs focusing using the number of samples or the sampling period thus set. For example, thirty samples or one sample every millisecond may be performed between imaging positions.

Note that the number of samples or the sampling period may be set for each focusing method, or different settings may be adopted for the optical-path length difference method and the image-plane phase difference method (described subsequently). For example, in the case of the optical-path length difference method, thirty samples or one sample every millisecond may be set, while in the image-plane phase difference method, a smaller number of samples or a longer sampling period than in the optical-path length difference method may be set. Such a setting is effective, for example, when the image-plane phase difference method enables more accurate distance measurement than the optical-path length difference method.

On the other hand, light emission control and exposure control are executed based on the position information of the stage 103. The position information of the stage 103 is, for example, a pulse signal outputted from the stage control unit 130 to the stepping motor of the stage 103. However, the position information of the stage 103 may be information regarding the elapsed time since the start of movement of the stage 103 that can be converted into the position of the stage, or may be an output signal from an encoder provided to the stage 103. FIG. 3 illustrates a state in which, when the stage 103 reaches each imaging position, an imaging position signal indicating the imaging position is outputted based on the position information.

When the imaging position signal is turned on, the control unit 180 temporarily increases the light emission intensity of the light source 101 in order to perform imaging. That is, the control unit 180 changes the light emission intensity of the light source 101 to a light emission intensity (hereinafter referred to as the second light emission intensity.) larger than the light emission intensity during the focus evaluation period (hereinafter referred to as the first light emission intensity.) based on the position information of the stage 103. Furthermore, the control unit 180 sets the exposure period within the period in which the light source 101 emits light at the second light emission intensity. More specifically, the control unit 180 starts the exposure period when the light emission intensity of the light source 101 has changed to the second light emission intensity and the light emission intensity after the change has stabilized.

Thus, by performing the light emission control and the exposure control on the basis of the position information of the stage 103, it is possible to capture an image of the specimen S during a period in which same is illuminated with a large intensity for imaging (the imaging illumination period), and hence a bright WSI can be obtained. In particular, because the illumination state during the exposure period is stabilized by starting the exposure period after the light emission intensity has stabilized, it is possible to suppress the difference in the illumination state for each imaging. As a result, it is possible to obtain a WSI with less unevenness across the entire image region.

Note that, if the exposure time, which is the length of the exposure period, is too short, the light incident on the two-dimensional imaging element 170 during the exposure period becomes too small, and a bright image cannot be obtained. However, if the exposure time is too long, the specimen S moves significantly with respect to the actual field of view during the exposure period, and thus image blurring occurs.

If the movement amount of the image of the specimen S during the exposure period is sufficiently small with respect to the pixel pitch, the effect of image blurring can be kept small. Therefore, the control unit 180 desirably sets the exposure time based on the movement speed of the stage 103 during the exposure period. Specifically, the control unit 180 desirably sets the exposure time such that a movement amount of the stage 103 during the exposure period is smaller than a ⅓ pixel in the image of the two-dimensional imaging element 170 projected on the stage 103. As a result, the effect of the image blurring can be substantially eliminated. The exposure time is, for example, 5 μs or less.

In addition, the control unit 180 adjusts the light emission intensity from the second light emission intensity to the first light emission intensity in accordance with the end of the exposure period. At this time, the first light emission intensity is desirably 1/10 or less of the second light emission intensity, for example. This is because, in a case where real-time AF is performed during scanning, in the imaging element, light incident during the read transfer period after the end of the exposure period may leak and become noise. More specifically, for example, in a case where charge is read for each line, the effect of leakage increases for lines later in the reading order, and color unevenness or the like occurs between lines. In this regard, by reducing the light emission intensity to coincide with the end of the exposure period, the effect of noise caused by light incident on the two-dimensional imaging element 170 during the read transfer period can be greatly suppressed. In particular, by suppressing the light emission intensity to 1/10 or less, the effect of noise can be suppressed to less than one gradation, and the substantial effect can be eliminated.

More desirably, the control unit 180 sets the exposure time based on the movement speed of the stage 103 and the second light emission intensity. By considering the second light emission intensity in addition to the movement speed of the stage 103, it is possible to consider the effect on the brightness of the image in addition to the effect on the image blurring caused by the exposure time. Therefore, it is possible to set an exposure time which achieves a balance, at a high level, between suppressing image blurring and ensuring image brightness. Note that, because a larger exposure amount can be achieved with a shorter exposure time as the second light emission intensity increases, it is easy to suppress image blurring while also ensuring image brightness. Therefore, the second light emission intensity is desirably the maximum light emission intensity of the light source 101. Note that there are limitations with regard to both shortening the exposure time and also increasing the light emission intensity, and thus both are desirably adjusted as appropriate.

Figure 4:
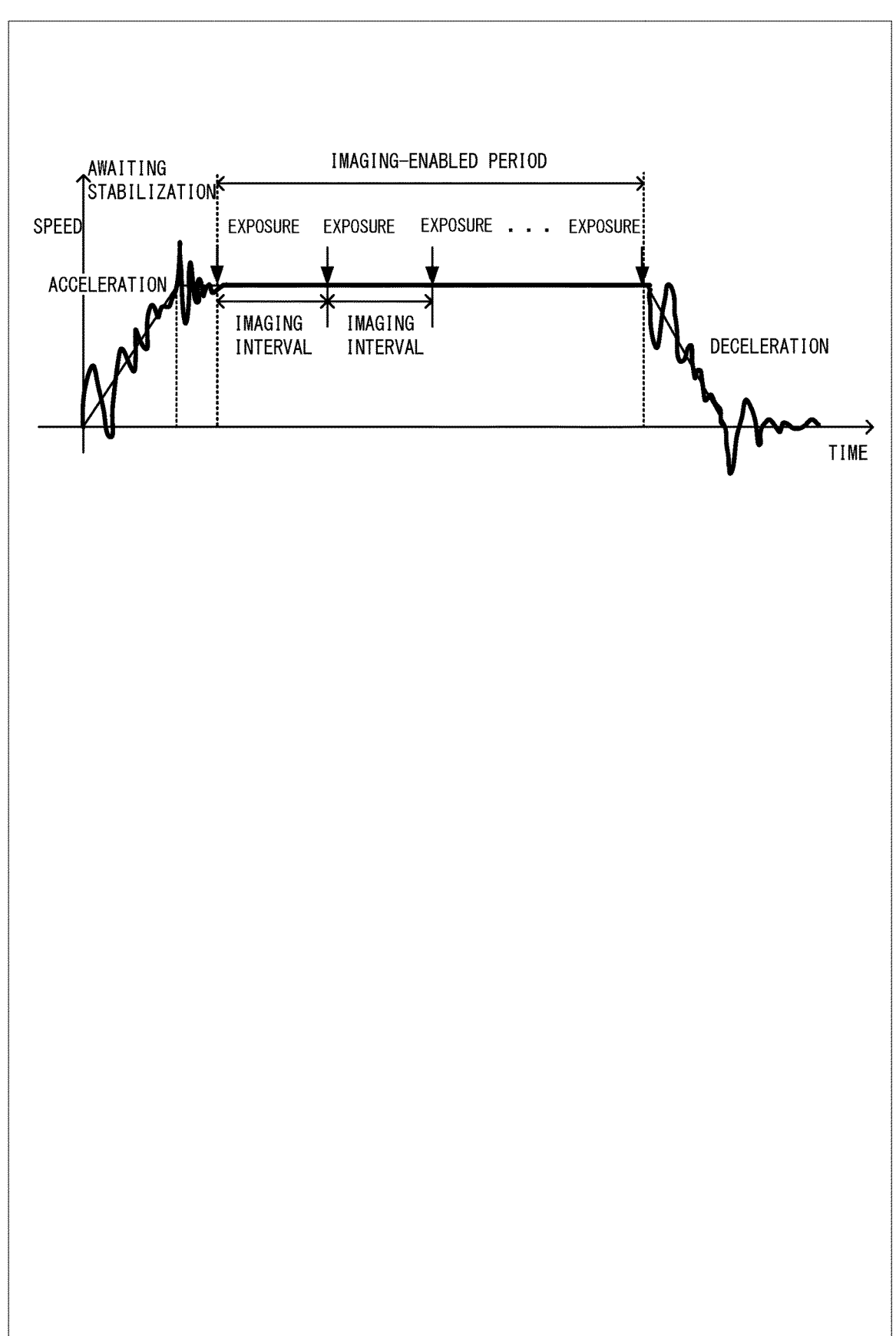
FIG. 4 is a diagram illustrating an example of changes in stage movement speed with respect to time.

Hereinafter, a more desirable setting of the microscope system 1 will be described. FIG. 4 is a diagram illustrating an example of changes in stage movement speed with respect to time. Desirable setting for the movement range of the stage 103 will now be described with reference to FIG. 4.

For example, as illustrated in FIG. 2, when the specimen S is scanned back and forth in the sub-scanning direction, it is necessary to start and stop the stage 103 for each line. In such scanning, the stage 103 desirably starts to move to each line from the outside of the target range for imaging, passes through the target range, and then moves to the outside of the target range. As illustrated in FIG. 4, when a constant target speed is sought, the movement speed of the stage 103 requires a certain amount of time since the start of acceleration until stabilizing at the target speed. In view of this point, the movement start position of the stage 103 is desirably determined to be a position which is an approach distance away from the target range so that the stage 103 moves constantly at the target speed at least in the target range. As a result, images of the specimen S can be acquired at a predetermined frame rate at spatially equal intervals. In addition, deterioration in image quality due to vibration of the stage 103 can also be suppressed.

Figure 5:
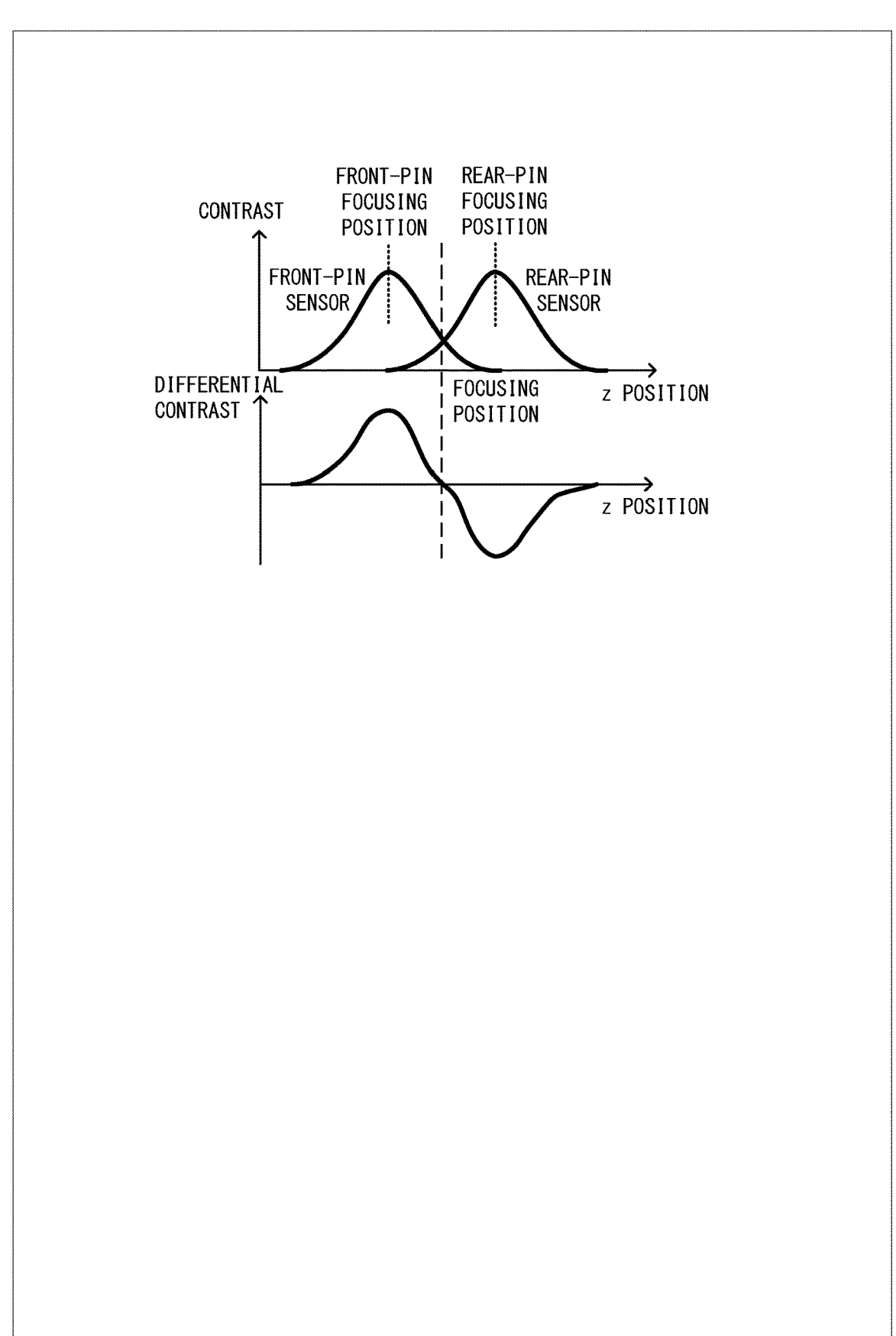
FIG. 5 is a diagram to illustrate an example of focus evaluation information.
Figure 6:
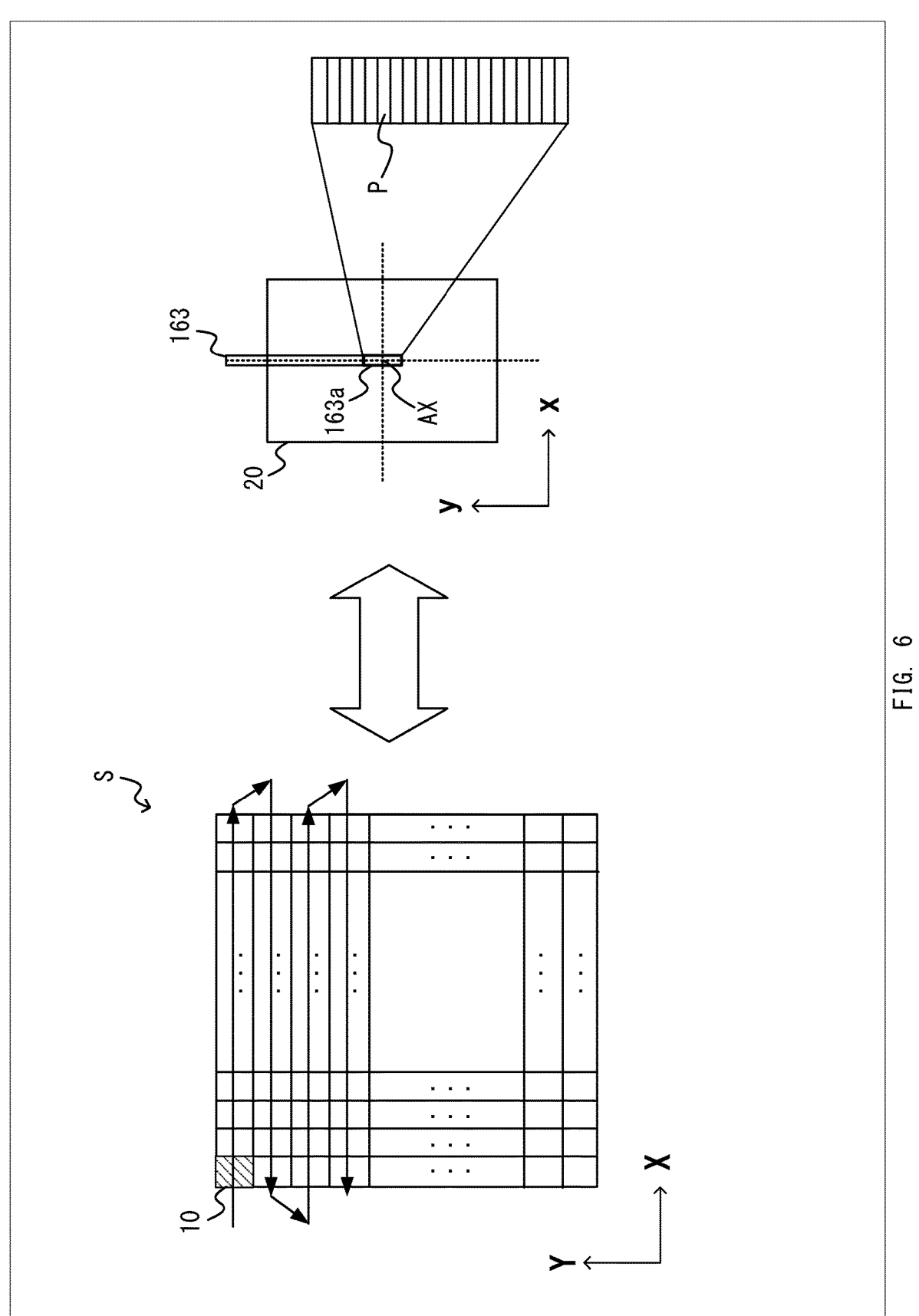
FIG. 6 is a diagram to illustrate an example of an AF sensor arrangement.
Figure 7:
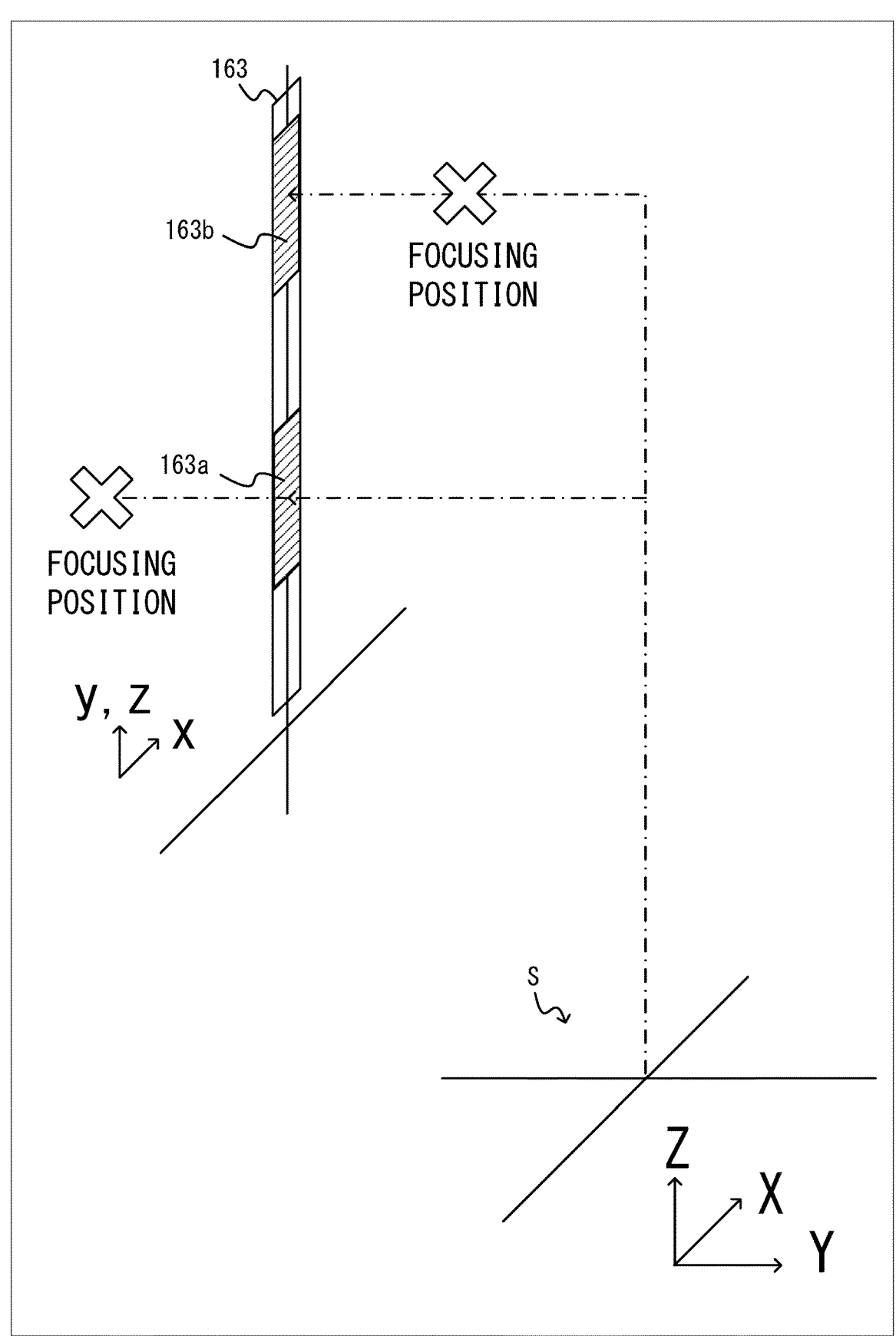
FIG. 7 is a diagram to illustrate the arrangement of a front-pin sensor region and a rear-pin sensor region that are included in an AF sensor.

FIG. 5 is a diagram to illustrate an example of focus evaluation information. FIG. 6 is a diagram to illustrate an example of an AF sensor arrangement. FIG. 7 is a diagram to illustrate the arrangement of a front-pin sensor region and a rear-pin sensor region that are included in an AF sensor. A desirable arrangement of the AF sensor 163 contained in the focusing unit 160 will now be described with reference to FIGS. 1, and 5 to 7.

The focusing unit 160 is a unit that detects a focusing position by means of a so-called optical path length difference method using a front-pin sensor and a rear-pin sensor, and outputs focus evaluation information that includes a differential contrast, which is the difference between the contrast detected by the front-pin sensor and the rear-pin sensor. The optical path difference method is suitable for use in real-time AF that is performed during the movement period in that it is possible to grasp the orientation of the focusing position and to specify the orientation with which the position (z position) of the objective lens 104 is to be moved, and hence enables focusing to be performed quickly.

A configuration of the focusing unit 160 will now be described. As illustrated in FIG. 1, the focusing unit 160 includes a condenser lens 161, a splitter 162, a sensor 163, and a focus recognition unit 164. The focusing unit 160 is provided on an optical path for autofocus that is branched by a splitter 105 from an optical path between the objective lens 104 and the two-dimensional imaging element 170.

Note that the splitter 105 is an example of an optical path splitting element that is disposed on the optical path between the objective lens 104 and the two-dimensional imaging element 170. The splitter 105 may guide at least a portion of the incident light to an optical path for autofocus toward the sensor 163, and may be a half mirror, for example.

The condenser lens 161 is a lens corresponding to the tube lens 106 disposed between the objective lens 104 and the two-dimensional imaging element 170, and forms an image of the specimen S on an optical path for autofocus. The splitter 162 is a half mirror disposed between the condenser lens 161 and the sensor 163, and divides the light which has passed through the condenser lens 161 into two.

The sensor 163 is, for example, an array sensor in which a plurality of pixels is arranged. The two light beams split by the splitter 162 fall incident on different regions of the sensor 163 through mutually different optical path lengths from the specimen S. More specifically, one of the two different regions of the sensor 163 may detect one light beam in front of the position optically conjugate with the front focal position of the objective lens 104 (that is, the focusing position), and the other of the two different regions of the sensor 163 may detect the other light beam to the rear of the position optically conjugate with the front focal position of the objective lens 104. That is, the sensor 163 includes a first sensor (front-pin sensor) that detects light in a first position (front-pin position) in front of the position optically conjugate with the front focal position of the objective lens 104 and a second sensor (rear-pin sensor) that detects light in a second position (rear pin position) to the rear of the position optically conjugate with the front focal position of the objective lens 104.

The focus recognition unit 164 generates focus evaluation information for detecting a focus state based on an output signal from the sensor 163. Specifically, as illustrated in FIG. 5, the focus recognition unit 164 calculates the contrast based on the output signals from the first sensor (front-pin sensor) and the second sensor (rear-pin sensor), and outputs, to the focus control unit 140, focus evaluation information including a differential contrast, which is the difference between the calculated contrasts. That is, the focus evaluation information includes information (the differential contrast) calculated based on the signal corresponding to the first position outputted from the first sensor and the signal corresponding to the second position outputted from the second sensor.

By configuring the focusing unit 160 as described above, the focus control unit 140 is capable of specifying the orientation of the focusing position according to the sign (positive or negative) of the differential contrast. Therefore, the focus control unit 140 is capable of determining the orientation for moving the objective lens 104 from the sign of the differential contrast, and also of determining the distance and speed with which objective lens 104 is moved using the absolute value of the differential contrast. Therefore, high-speed focusing can be realized.

The sensor 163 is not particularly limited, but may be, for example, a line sensor in which a plurality of pixels is aligned in a certain direction. In a case where the sensor 163 is a line sensor, as illustrated in FIG. 6, the plurality of pixels P included in the sensor 163 is desirably arranged to be aligned in a direction (y direction) corresponding to the main scanning direction (Y direction). The shape of the pixel P of the line sensor is generally a rectangle having a short side in the alignment direction. Therefore, through the arrangement as per FIG. 6, the pixels P have a long shape in the movement direction (sub-scanning direction), and therefore the effect of image blurring can be suppressed. This is because the ratio of the region projected across the pixels during the exposure period to the region on the specimen S projected on one pixel is reduced.

In addition, by arranging the sensor 163 as illustrated in FIG. 6, it is possible to detect light, in two regions separated in the y direction of the sensor 163 (the region 163a and the region 163b), having a different optical path length corresponding to the distance between the two regions, as illustrated in FIG. 7. That is, the y direction can also be used as a direction (z direction) corresponding to the optical axis direction (Z direction) on the specimen S. As a result, as illustrated in FIG. 7, the line sensor alone can play the roles of both the first sensor and the second sensor described above.

Note that the actual visual field projection range 20 illustrated in FIG. 6 indicates a region, on a surface where the sensor 163 is disposed, onto which the actual field of view 10 is projected. The main scanning direction (Y direction) is a direction in which the specimen S is scanned, and is a direction orthogonal to the movement direction of the stage 103 during the exposure period (X direction; also referred to as the sub-scanning direction). In addition, region 163a illustrated in FIG. 7 represents a front-pin sensor region, and region 163b represents a rear-pin sensor region.

Figure 8:
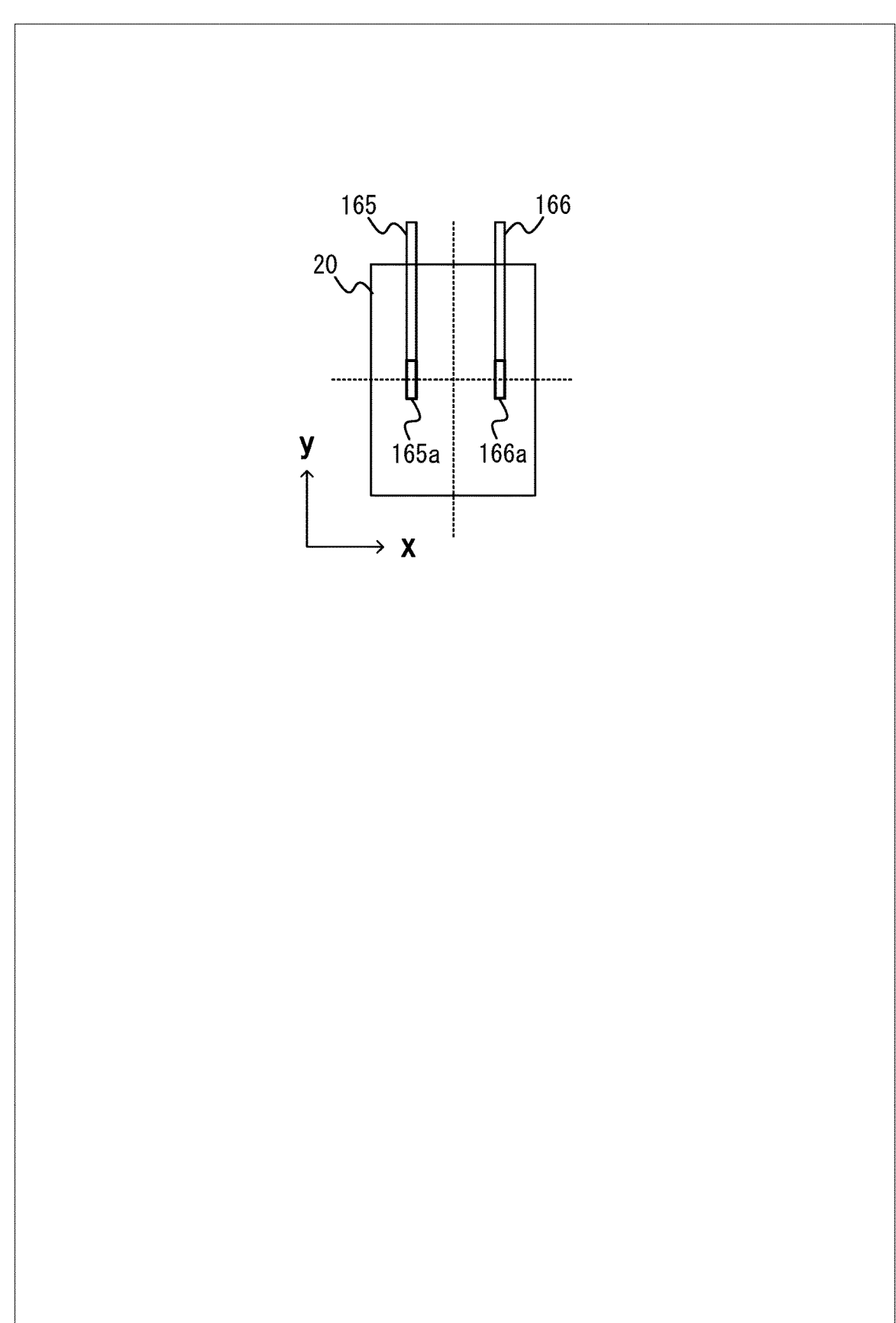
FIG. 8 is a diagram to illustrate another example of an AF sensor arrangement.
Figure 9:
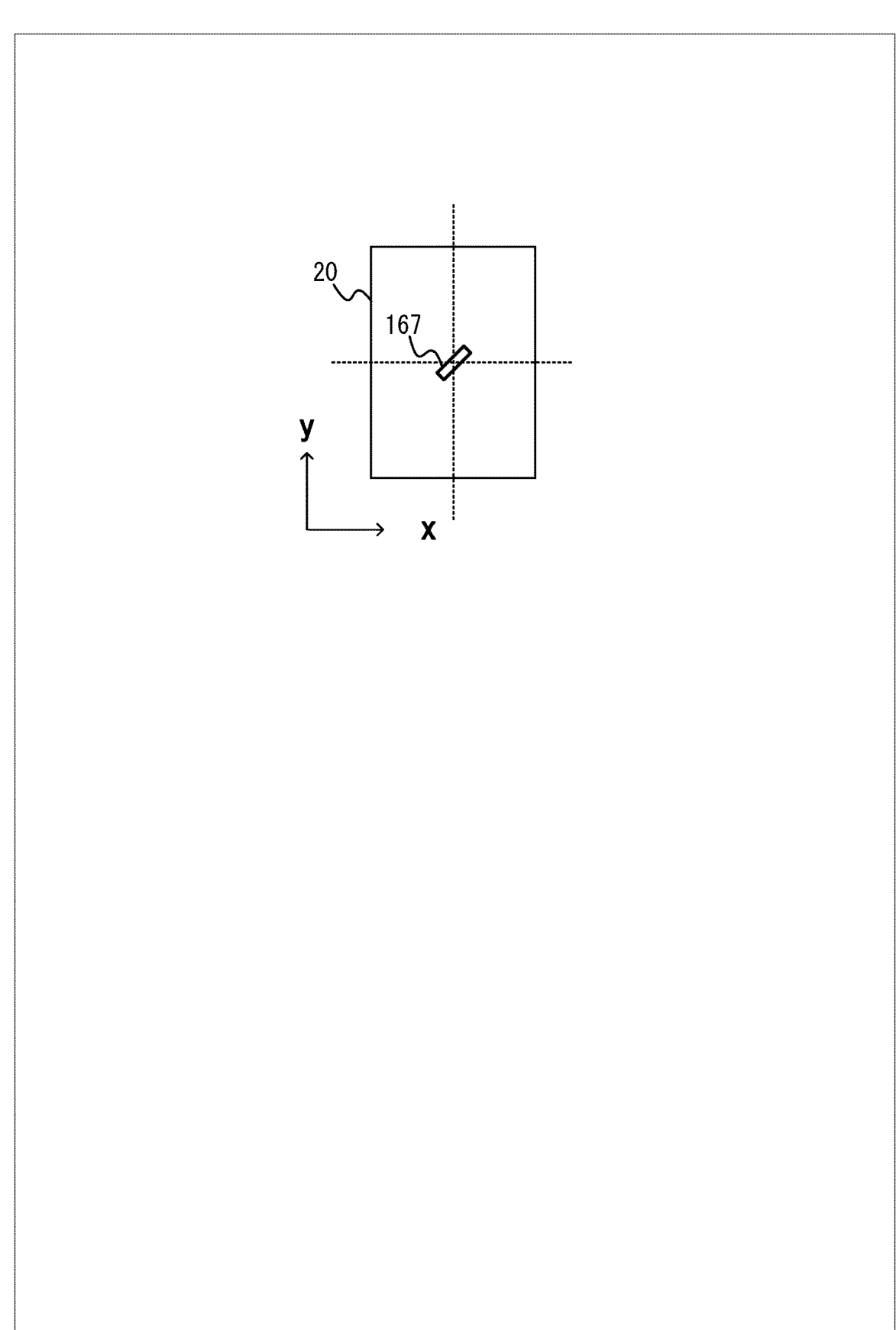
FIG. 9 is a diagram to illustrate yet another example of an AF sensor arrangement.

FIGS. 8 and 9 are diagrams to illustrate other respective examples of AF sensor arrangements. The focusing unit 160 may include, instead of the sensor 163, the sensor 165 and the sensor 166 illustrated in FIG. 8, and may include the sensor 167 illustrated in FIG. 9.

Although FIGS. 6 and 7 illustrate an example in which the sensor 163 is disposed so as to intersect the optical axis AX, the focusing unit 160 may include sensors for AF (the sensor 165, sensor 166) that are arranged in positions deviated from the optical axis AX as illustrated in FIG. 8. The sensor 165 is an example of a first array sensor, and the sensor 166 is an example of a second array sensor.

More specifically, the sensor 165 and the sensor 166 are each arranged in positions deviated from the optical axis AX in a direction (x direction) corresponding to the sub-scanning direction, and are further arranged at equal distances from the optical axis AX with the optical axis AX interposed therebetween. Furthermore, the sensor 165 and the sensor 166 are similar to the sensor 163 in that a plurality of pixels included in each sensor is arranged to be aligned in a direction (y direction) corresponding to the main scanning direction. Note that, similarly to the sensor 163, the sensor 165 and the sensor 166 also function as a front-pin sensor and a rear-pin sensor, respectively, in two regions separated from each other in the y direction. A region 165a and a region 166a illustrated in FIG. 8 each indicate a front-pin sensor region.

The focusing unit 160 uses the sensor 166 as an AF sensor on a forward path in which the stage 103 moves with a positive orientation in the sub-scanning direction, and uses the sensor 165 as an AF sensor on a backward path in which the stage 103 moves with a negative orientation in the sub-scanning direction. As a result, the region on the specimen S corresponding to the image projected on the AF sensor during the focus evaluation period is positioned near the center of the actual field of view 10 during the exposure period delayed in the temporal direction with respect to the focus evaluation period. Therefore, even when reciprocating scanning is performed, the image of the focused region is projected near the center of the actual visual field projection range 20, and a WSI with suppressed focus deviation can be obtained.

However, the sensor 163 disposed on the optical axis AX is capable of performing focusing under the same conditions only with one sensor even when imaging is performed on either the forward path or the backward path in which the stage 103 moves in the sub-scanning direction.

In addition, FIGS. 6 and 7 illustrate an example in which the plurality of pixels included in the sensor 163 are arranged so as to be aligned in the direction corresponding to the movement direction of the stage 103. However, as illustrated in FIG. 9, the focusing unit 160 may include a line sensor (sensor 167) having a plurality of pixels aligned in the direction corresponding to the direction inclined with respect to the movement direction of the stage 103. By arranging the sensors obliquely, it is possible to suppress the effect of image blurring not only in a raster scan in which specimen S is scanned in line units but also in a tornado scan in which the specimen S is scanned in a spiral shape.

Second Embodiment

Figure 10:
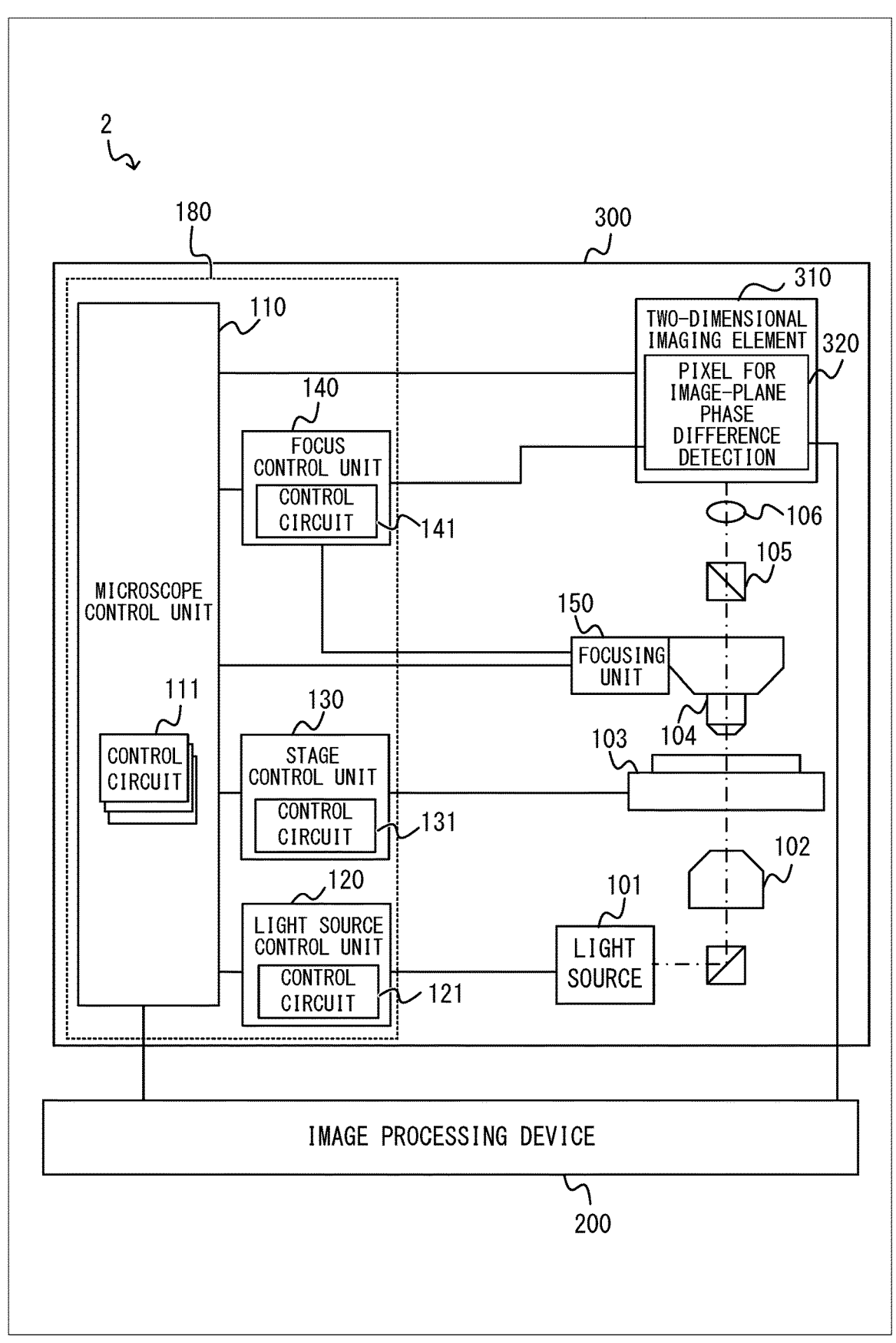
FIG. 10 is a diagram illustrating an example of a configuration of a microscope system according to a second embodiment.

FIG. 10 is a diagram illustrating an example of a configuration of a microscope system according to the present embodiment. A microscope system 2, which is illustrated in FIG. 10, is an example of a microscope system according to the second embodiment, and is a whole slide imaging device that generates whole slide images (WSI) similarly to the microscope system 1.

The microscope system 2 includes a microscope device 300 instead of the microscope device 100. The microscope device 300 is different from the microscope device 100 in that a focusing position is detected using the image-plane phase difference method instead of the focusing position being detected using the optical-path length difference method. The microscope device 300 includes a two-dimensional imaging element 310 instead of the two-dimensional imaging element 170 and the focusing unit 160. The two-dimensional imaging element 310 is an imaging element having a pixel 320 for image-plane phase difference detection. In the microscope system 2, the focus control unit 140 executes focus control based on focus evaluation information including information which is calculated based on the output signal from the pixel 320 for image-plane phase difference detection.

Note that, similarly to the optical-path length difference method, the image-plane phase difference method makes it possible to grasp the orientation of the focusing position and to realize high-speed focusing. Further, by combining phase difference detection using the pixel 320 for image-plane phase difference detection with contrast detection using a normal pixel other than the pixel 320 for image-plane phase difference detection, it is possible to perform focusing at high speed and with high accuracy.

Also in the microscope system 2, the control unit 180 executes focus control, exposure control, and light emission control in the sequence illustrated in FIG. 3. As a result, the same advantageous effects as those of the microscope system 1 can be obtained by the microscope system 2. That is, it is possible to achieve both image quality and throughput at a high level, and a WSI of high image quality can be obtained in a short time.

FIGS. 11A to 11D are diagrams illustrating examples of the relationship between stage movement directions and regions enabling a pixel for image-plane phase difference detection. Although a plurality of pixels 320 for image-plane phase difference detection are scattered in the two-dimensional imaging element 310, the control unit 180 may select a pixel to be used for focus control from among these pixels according to the movement direction of the stage 103. Specifically, it is desirable to select a pixel 320 for image-plane phase difference detection which is disposed in a region on the two-dimensional imaging element 310 corresponding to the downstream side in the traveling direction of the stage 103 with respect to the optical axis AX. That is, the focus evaluation information used for the focus control by the focus control unit 140 may include information calculated based on the output signal from the pixel 320 for image-plane phase difference detection selected from among the plurality of pixels 320 for image-plane phase difference detection according to the movement direction of the stage 103.

Figure 11A:
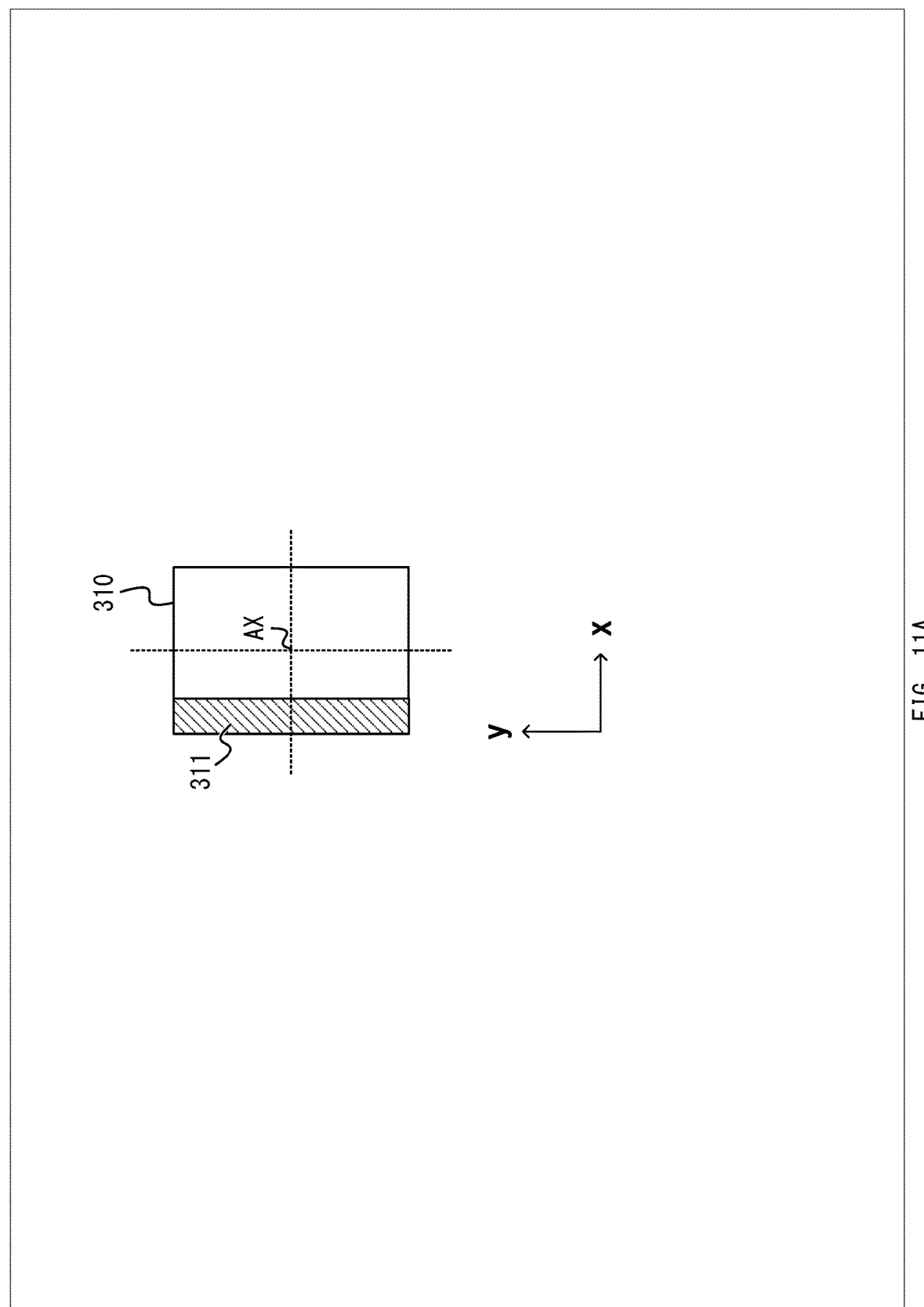
FIGS. 11A to 11D are diagrams illustrating examples of the relationship between stage movement directions and regions enabling a pixel for image-plane phase difference detection.
Figure 11B:
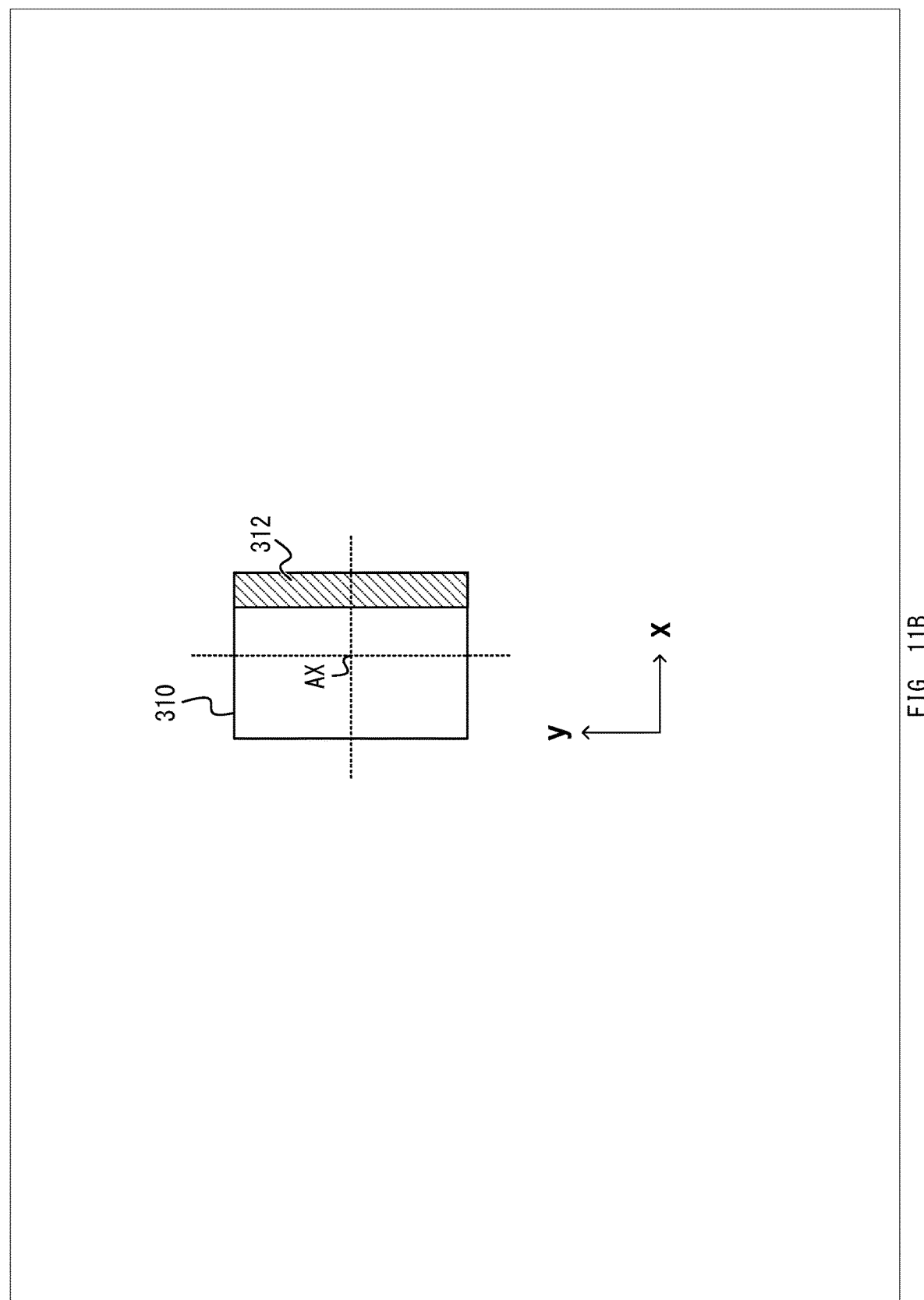
Figure 11C:
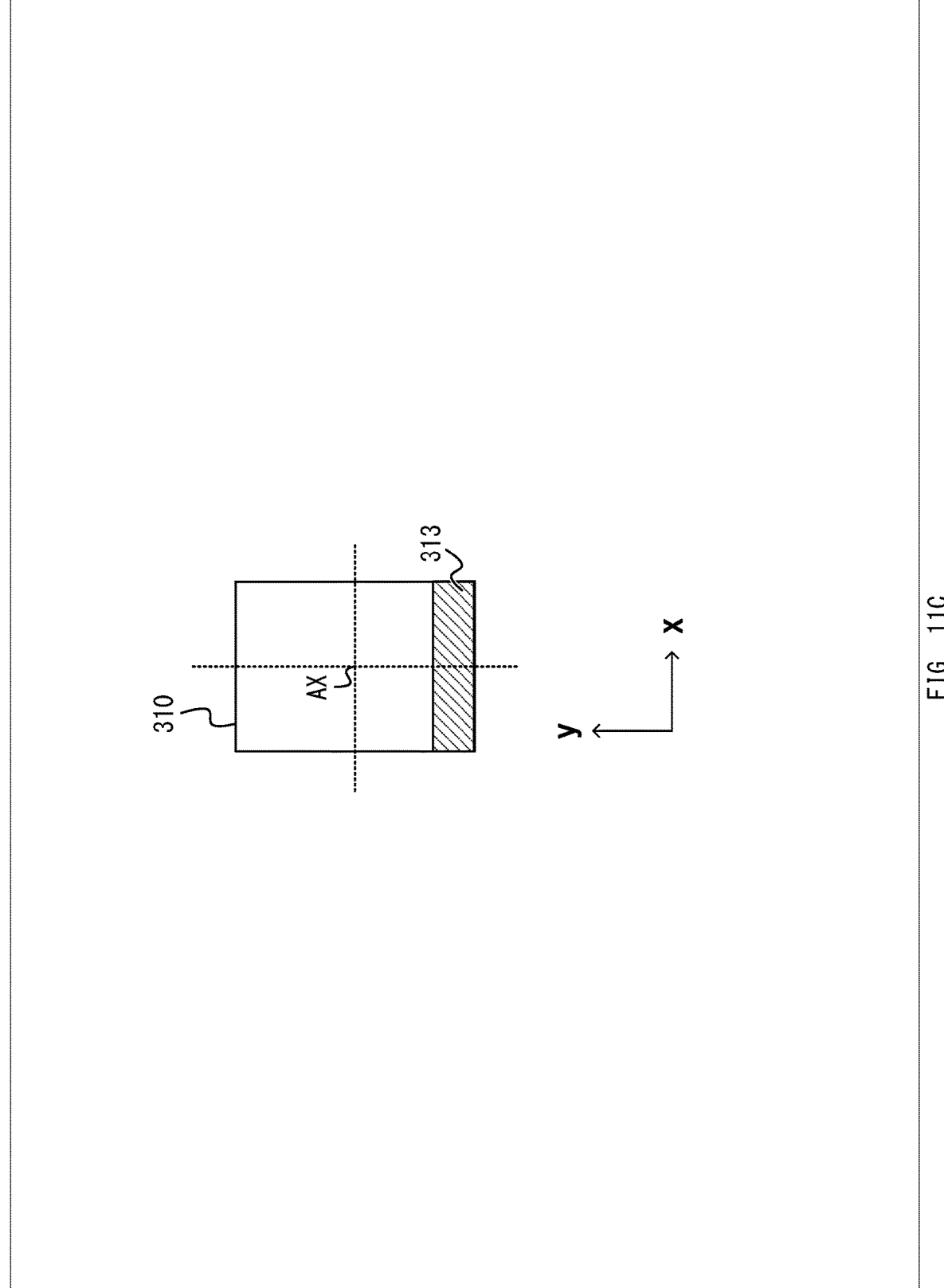
Figure 11D:
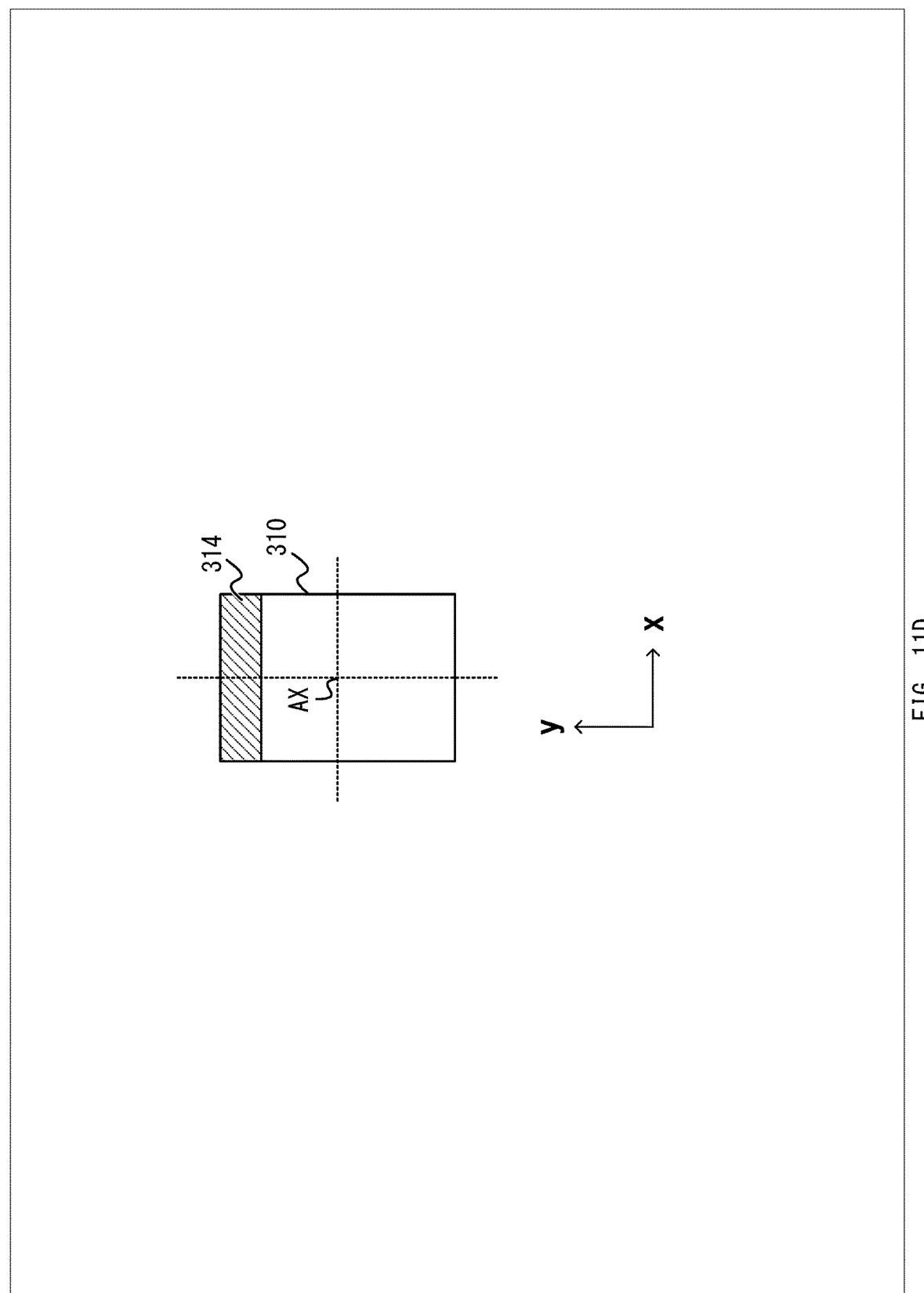

For example, when the stage 103 moves in the X direction (negative orientation), it is desirable to select a pixel 320 for image-plane phase difference detection which is disposed in a region 311 on the negative side in the x direction with respect to the optical axis AX as illustrated in FIG. 11A. When the stage 103 moves in the X direction (positive orientation), it is desirable to select a pixel 320 for image-plane phase difference detection which is disposed in a region 312 on the positive side in the x direction with respect to the optical axis AX, as illustrated in FIG. 11B. When the stage 103 moves in the Y direction (negative orientation), it is desirable to select a pixel 320 for image-plane phase difference detection which is disposed in a region 313 on the negative side in the y direction with respect to the optical axis AX, as illustrated in FIG. 11C. When the stage 103 moves in the Y direction (positive orientation), it is desirable to select a pixel 320 for image-plane phase difference detection which is disposed in a region 314 on the positive side in the y direction from the optical axis AX, as illustrated in FIG. 11D.

By changing the region on the two-dimensional imaging element 310 to be used according to the movement direction of the stage 103, it is possible to focus on the region near the center of the actual field of view 10 during the exposure period delayed in the temporal direction with respect to the focus evaluation period. Therefore, a WSI with suppressed focus deviation can be obtained.

Third Embodiment

Figure 12:
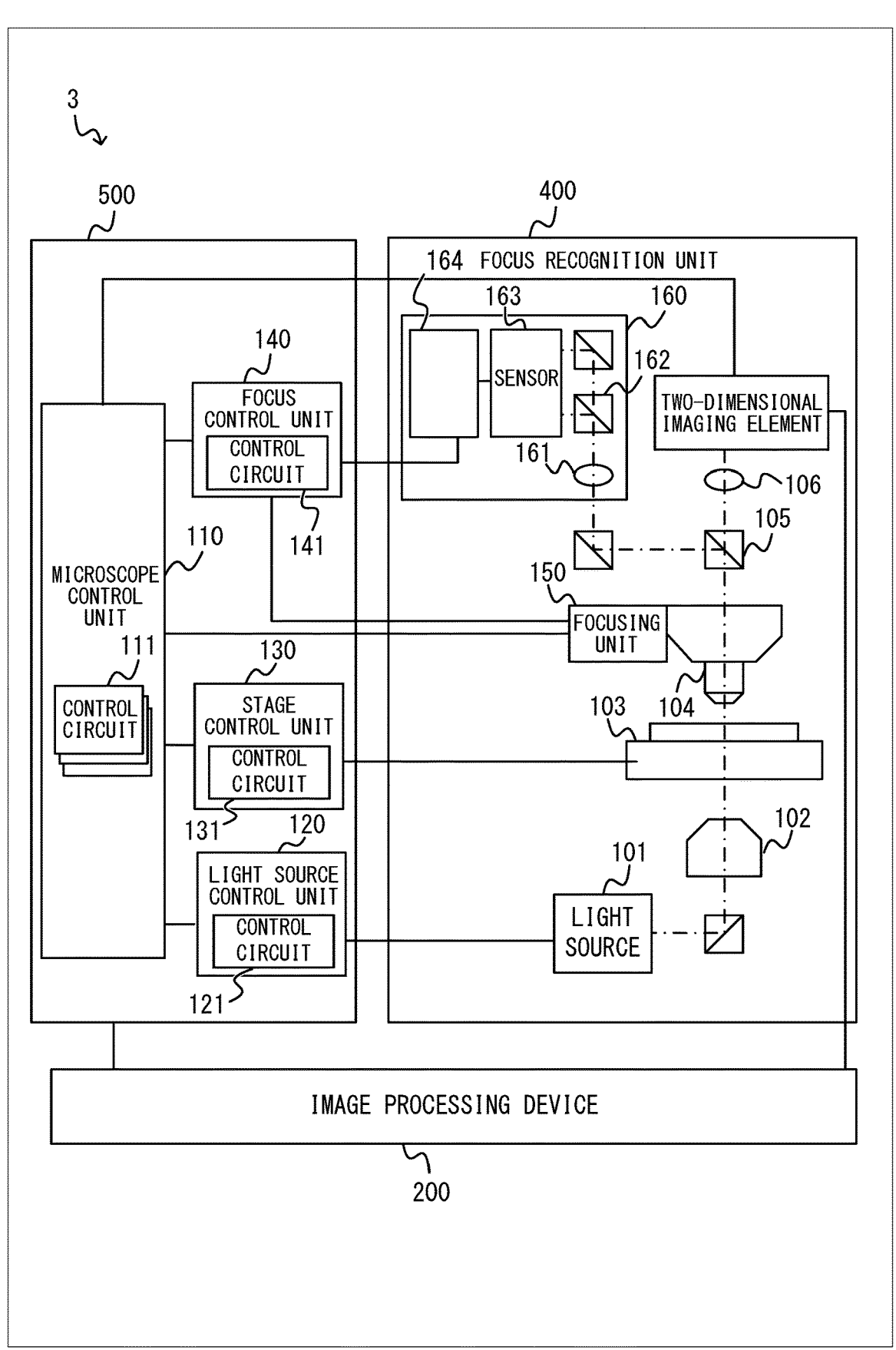
FIG. 12 is a diagram illustrating an example of a configuration of a microscope system according to a third embodiment.

FIG. 12 is a diagram illustrating an example of a configuration of a microscope system according to this embodiment. A microscope system 3, which is illustrated in FIG. 12, is an example of a microscope system according to a third embodiment, and is a whole slide imaging device that generates whole slide images (WSI) similarly to the microscope system 1.

As illustrated in FIG. 12, the microscope system 3 includes a microscope device 400, a microscope control device 500, and an image processing device 200. The microscope system 3 differs from the microscope system 1 in that the former includes a microscope control device 500 that is separate from the microscope device 400. The microscope control device 500 is obtained by separating the configuration corresponding to the control unit 180 of the microscope device 100 illustrated in FIG. 1 from the microscope device 100, and the microscope device 400 is obtained by removing the configuration corresponding to the control unit 180 from the microscope device 100.

In the microscope system 3, the microscope control device 500 executes focus control, exposure control, and light emission control in the sequence illustrated in FIG. 3. As a result, the same advantageous effects as those of the microscope system 1 can be obtained by the microscope system 3. That is, it is possible to achieve both image quality and throughput at a high level, and a WSI of high image quality can be obtained in a short time.

Figure 13:
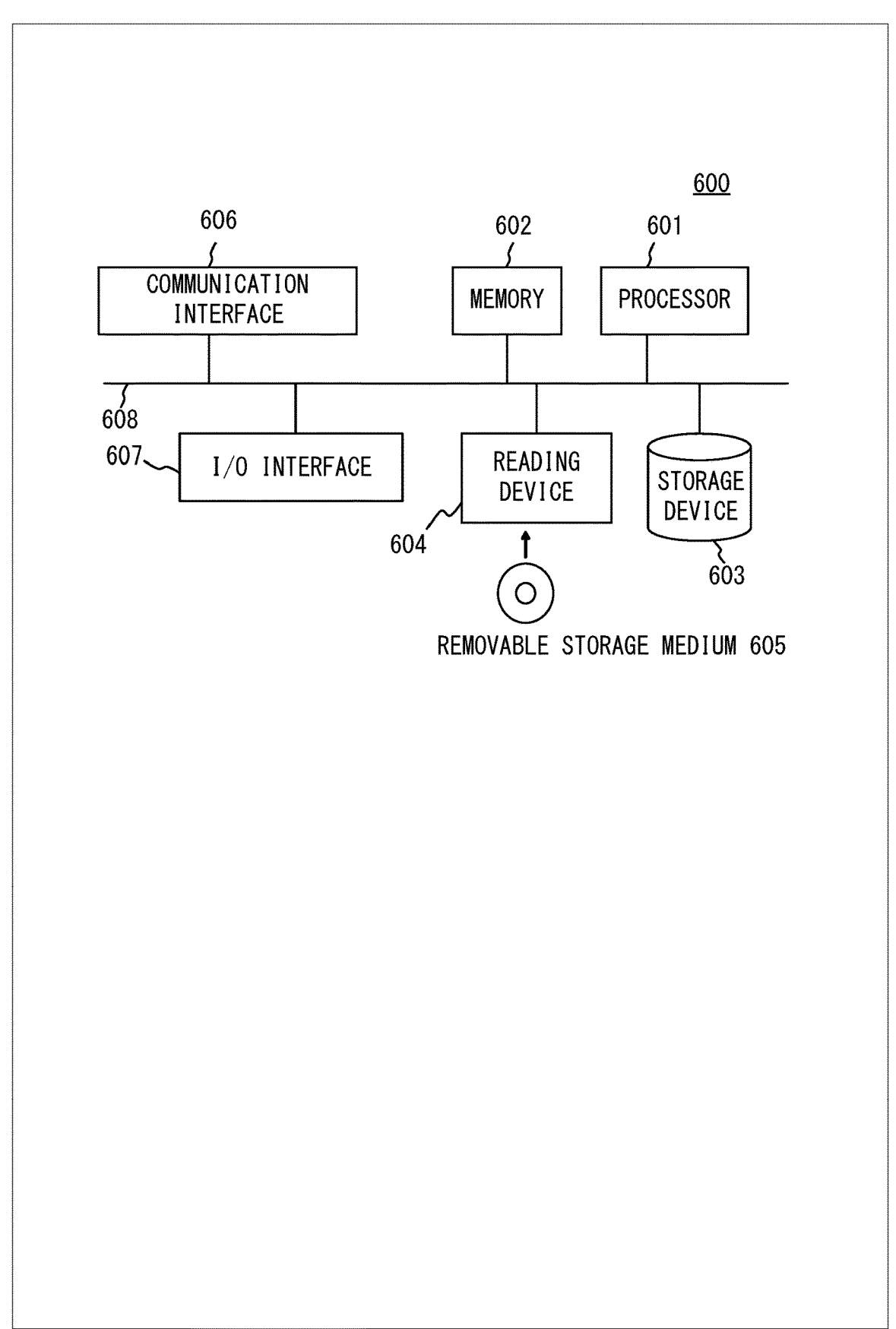
FIG. 13 is a diagram illustrating a computer hardware configuration for realizing a microscope device and a microscope control device.

FIG. 13 is a diagram illustrating a hardware configuration of a computer 600 for realizing the microscope device 100, the microscope device 300, and the microscope control device 500 described above. The hardware configuration illustrated in FIG. 13 includes, for example, a processor 601, a memory 602, a storage device 603, a reading device 604, a communication interface 606, and an I/O interface 607. Note that the processor 601, the memory 602, the storage device 603, the reading device 604, the communication interface 606, and the I/O interface 607 are connected to one another, for example, via a bus 608.

For example, the processor 601 may be a single processor, a multiprocessor, or a multicore processor. By reading and executing a program stored in the storage device 603, the processor 601 operates as the microscope control unit 110, the light source control unit 120, the stage control unit 130, and the focus control unit 140 described earlier.

The memory 602 is a semiconductor memory, for example, and may include a RAM area and a ROM area. For example, the storage device 603 is a hard disk, a semiconductor memory such as a flash memory, or an external storage device.

The reading device 604 accesses a storage medium 605 in accordance with instructions from the processor 601, for example. For example, the storage medium 605 is achieved by a semiconductor device, a medium to/from which information is inputted/outputted by a magnetic action, or a medium to/from which information is inputted/outputted by an optical action. Note that the semiconductor device is a universal serial bus (USB) memory, for example. Further, the medium from/to which information is inputted/outputted by the magnetic action is, for example, a magnetic disk. The medium from/to which information is inputted/outputted by an optical action is, for example, a compact disc (CD)-ROM, a digital versatile disk (DVD), or a Blu-ray disc (Blu-ray is a registered trademark).

The communication interface 606 communicates with other devices in accordance with instructions from the processor 601, for example. The I/O interface 607 is an interface between an input device and an output device, for example. The input device is, for example, a device such as a keyboard, a mouse, or a touch panel which receives an instruction from the user. The output device is, for example, a display device such as a display and a sound device such as a speaker.

The program to be executed by the processor 601 is provided to the computer 600 in the following forms, for example:

(1) Pre-installed on the storage device 603.
(2) Provided by the storage medium 605.
(3) Provided from a server such as a program server It should be noted that the hardware configurations of the computer 600 for realizing the microscope device and the microscope control device, described with reference to FIG. 13, are exemplary, and the embodiments are not limited thereto. For example, the above-mentioned configurations may be partially eliminated, or new configurations may be added. Moreover, in another embodiment, for example, some or all of the functions of the above-mentioned electric circuit may be implemented as hardware by a field programmable gate array (FPGA), a system-on-a-chip (SoC), an application specific integrated circuit (ASIC), a programmable logic device (PLD), or the like.

As an example of a configuration for performing various types of computer control, parts close to hardware for current control and focus control such as a motor, or a light source, or the like, may also be controlled by a microcomputer (firmware). Timing control may also be performed by an FPGA. Further, the scanning range of the slide glass, the stitching of the scanned images and the management thereof, and the determination of the exposure time and the light source intensity may be performed by a general-purpose computer such as a personal computer.

The embodiments described above are specific examples to facilitate understanding of the invention, and thus the present invention is not limited to these embodiments. Modifications obtained by modifying the foregoing embodiments and alternative embodiments replacing the above embodiments can be included. In other words, in each embodiment, the components can be modified without departing from the spirit and the scope thereof. Further, a new embodiment can be implemented by appropriately combining a plurality of components disclosed in one or more of the embodiments. Additionally, some components may be omitted from the components disclosed in each embodiment, or some components may be added to the components disclosed in the embodiments. Further, the order of the processing in each embodiment is interchangeable as long as there is no contradiction. In other words, the microscope system and the microscope control device of the present invention can be variously modified and altered within the scope without departing from the disclosures of the claims.

In the above-described embodiments, an example has been described in which the focusing unit 150 moves the objective lens 104 in the optical axis direction. However, the focusing unit 150 only needs to change the distance between the objective lens 104 and the stage 103, and the microscope device 100 may include, for example, the Z stage included in the stage 103 as the focusing unit 150. Furthermore, the focusing unit 150 may also handle manual operations, and the stage 103 may be moved in the optical axis direction in response to the operation of a handle (not illustrated), for example.

In the above-described embodiments, an example in which the microscope device includes an upright microscope has been described, but the microscope device is not limited to being an upright microscope and may be an inverted microscope. Further, the microscope device only needs to include a two-dimensional imaging element, and there are no particular restrictions on the observation method. The microscope device may perform a bright field observation method, a phase difference observation method, a differential interference observation method, a fluorescence observation method, or the like, and an observation method in which an observation direction and an illumination direction are different, such as light sheet microscopy, may be adopted.

In the above-described embodiments, an example in which the light source 101 constantly emits light during scanning has been described, but the light source 101 may be turned off where appropriate. The control unit 180 may turn off the light source 101 while avoiding the focus evaluation period and the exposure period.

In the above-described embodiments, an example has been described in which the real-time AF is continued during scanning and the focus control is executed using a predetermined sampling period, but the real-time AF may also be stopped as appropriate. The control unit 180 may stop the real-time AF during the exposure period to actively prevent an overlap between the exposure period and the focus evaluation period.

In the present specification, the expression "based on A" does not signify "based only on A," rather, same signifies "based on at least A," and also means "based partially on at least A." That is, "based on A" may indicate "based on B in addition to A" or "based on part of A."

What is claimed is:

1. A microscope system, comprising:
   a light source;
   an objective lens;
   a stage;
   a two-dimensional image sensor that captures an image of a specimen placed on the stage;
   a focusing device that changes a distance between the objective lens and the stage; and
   a control circuit, wherein the control circuit:
      executes, during a movement period in which the stage moves in a direction orthogonal to an optical axis of the objective lens, focus control for controlling the focusing device based on focus evaluation information detected during the movement period, and exposure control for controlling an exposure period of the two-dimensional image sensor, executes light emission control that causes the light source to emit light with different light emission intensities during the exposure period and during a focus evaluation period in which the focus evaluation information is detected, changes the light emission intensity of the light source to a second light emission intensity larger than a first light emission intensity during the focus evaluation period, based on position information of the stage, and sets the exposure period within a period in which the light source emits light at the second light emission intensity.

2. The microscope system according to claim 1, wherein the control circuit adjusts the light emission intensity from the second light emission intensity to the first light emission intensity to coincide with an end of the exposure period.

3. The microscope system according to claim 2, wherein the first light emission intensity is $\frac{1}{10}$ or less of the second light emission intensity.

4. The microscope system according to claim 1, wherein the control circuit sets an exposure time, which is a length of the exposure period, based on a movement speed of the stage during the exposure period.

5. The microscope system according to claim 1, wherein the control circuit sets an exposure time, which is a length of the exposure period, based on a movement speed of the stage during the exposure period and the second light emission intensity.

6. The microscope system according to claim 4, wherein the control circuit sets the exposure time such that a movement amount of the stage during the exposure period is smaller than a $\frac{1}{3}$ pixel in an image of the two-dimensional image sensor projected on the stage.

7. The microscope system according to claim 1, wherein the control circuit sets the focus evaluation period at least once between a first exposure period and a second exposure period which each constitute the exposure period and which are temporally adjacent to each other.

8. The microscope system according to claim 7, wherein the focus evaluation period is set using a predetermined sampling period, and wherein the predetermined sampling period is ten or more times an exposure time, which is a length of the exposure period.

9. The microscope system according to claim 7, wherein the control circuit sets the focus evaluation period so that there is no overlap with the exposure period.

10. The microscope system according to claim 1, further comprising:

an array sensor that includes a first sensor which detects light in a first position in front of a position optically conjugate with a front focal position of the objective lens, and a second sensor which detects light in a second position to the rear of a position optically conjugate with the front focal position; and an optical path splitting element that is disposed on an optical path between the objective lens and the two-dimensional image sensor and that guides at least a portion of incident light to an optical path toward the array sensor, wherein the focus evaluation information includes information calculated based on a signal corresponding to the first position outputted from the first sensor and a signal corresponding to the second position outputted from the second sensor.

11. The microscope system according to claim 10, further comprising:

a line sensor having a plurality of pixels, wherein the plurality of pixels are arranged so as to be aligned in a direction corresponding to a main scanning direction, which is a direction in which the specimen is scanned, and a direction orthogonal to a movement direction of the stage during the exposure period.

12. The microscope system according to claim 11, wherein the array sensor is disposed so as to intersect the optical axis.

13. The microscope system according to claim 11, wherein the array sensor is disposed in a position deviated from the optical axis in a direction corresponding to a sub-scanning direction, which is a direction in which the specimen is scanned and which is the movement direction of the stage during the exposure period.

14. The microscope system according to claim 13, wherein the array sensor includes a first array sensor and a second array sensor that are arranged with the optical axis interposed therebetween.

15. The microscope system according to claim 10, wherein the array sensor is a line sensor having a plurality of pixels aligned in a direction corresponding to a direction inclined with respect to a movement direction of the stage during the exposure period.

16. The microscope system according to claim 1, wherein the two-dimensional image sensor includes a pixel for image-plane phase difference detection, and wherein the focus evaluation information includes information which is calculated based on an output signal from the pixel for image-plane phase difference detection.

17. The microscope system according to claim 1, wherein the two-dimensional image sensor includes a plurality of pixels for image-plane phase difference detection, and wherein the focus evaluation information includes information which is calculated based on an output signal from a pixel selected from among the plurality of pixels for image-plane phase difference detection, according to a movement direction of the stage.

18. The microscope system according to claim 1, further comprising:

an image processing device that synthesizes a plurality of images of the specimen captured by the two-dimensional image sensor, each of the images corresponding to a different exposure period.

19. A microscope control device for controlling a microscope which is provided with a light source, an objective lens, a stage, a two-dimensional image sensor that captures an image of a specimen placed on the stage, and a focusing device that changes a distance between the objective lens and the stage, the microscope control device comprising:

a control circuit, wherein the control circuit:

executes, during a movement period in which the stage moves in a direction orthogonal to an optical axis of the objective lens, focus control for controlling the focusing device based on focus evaluation information detected during the movement period, and exposure control for controlling an exposure period of the two-dimensional image sensor, executes light emission control that causes the light source to emit light with different light emission intensities during the exposure period and during a focus evaluation period in which the focus evaluation information is detected, changes the light emission intensity of the light source to a second light emission intensity larger than a first light emission intensity during the focus evaluation period, based on position information of the stage, and sets the exposure period within a period in which the light source emits light at the second light emission intensity.

* * * * *